United States Patent [19]
McNair

[11] Patent Number: 5,892,204
[45] Date of Patent: Apr. 6, 1999

[54] VACUUM COFFEE MAKER

[75] Inventor: John Duncan McNair, Yuen Long, Hong Kong

[73] Assignee: Chiaphua Industries Limited, Hong Kong, Hong Kong

[21] Appl. No.: 818,363

[22] Filed: Mar. 17, 1997

[51] Int. Cl.[6] .......................... A47J 31/043; A47J 31/047
[52] U.S. Cl. ........................ 219/438; 219/440; 219/431; 219/432; 99/292
[58] Field of Search ..................................... 219/429, 431, 219/432, 436, 437, 438, 440; 99/292

[56] References Cited

U.S. PATENT DOCUMENTS

| | | | |
|---|---|---|---|
| 3,682,089 | 8/1972 | Unger et al. | 219/436 |
| 3,701,883 | 10/1972 | Tilp | 219/436 |
| 4,100,394 | 7/1978 | Tilp | 218/438 |
| 4,292,888 | 10/1981 | Wells et al. | 219/437 |
| 4,793,245 | 12/1988 | Kimura | 99/292 |
| 5,651,905 | 7/1997 | Thies et al. | 219/438 |

*Primary Examiner*—Teresa Walberg
*Assistant Examiner*—J. Pelham
*Attorney, Agent, or Firm*—Miller, Sisson, Chapman & Nash, P.C.

[57] ABSTRACT

A vacuum coffee maker has a starved electric heating arrangement having a solid body providing a reservoir. The chamber is covered by a circular lid that prevents flow of steam directly vertically up a tube from the chamber. At the end of a normal heating cycle, the temperature of the body rises rapidly and power supplied to a heating element is automatically turned off under the control of a thermostat. The heating arrangement is used without alteration (e.g. to the setting of the thermostat) to keep-warm hot coffee in a lower container after the end of the normal heating coffee-making cycle. The effect of having the lid is that during a keep-warm function, the reservoir is generally starved of liquid because any liquid entering the reservoir is immediately evaporated and this restricts flow of more liquid into the reservoir and hence starves the reservoir.

6 Claims, 2 Drawing Sheets

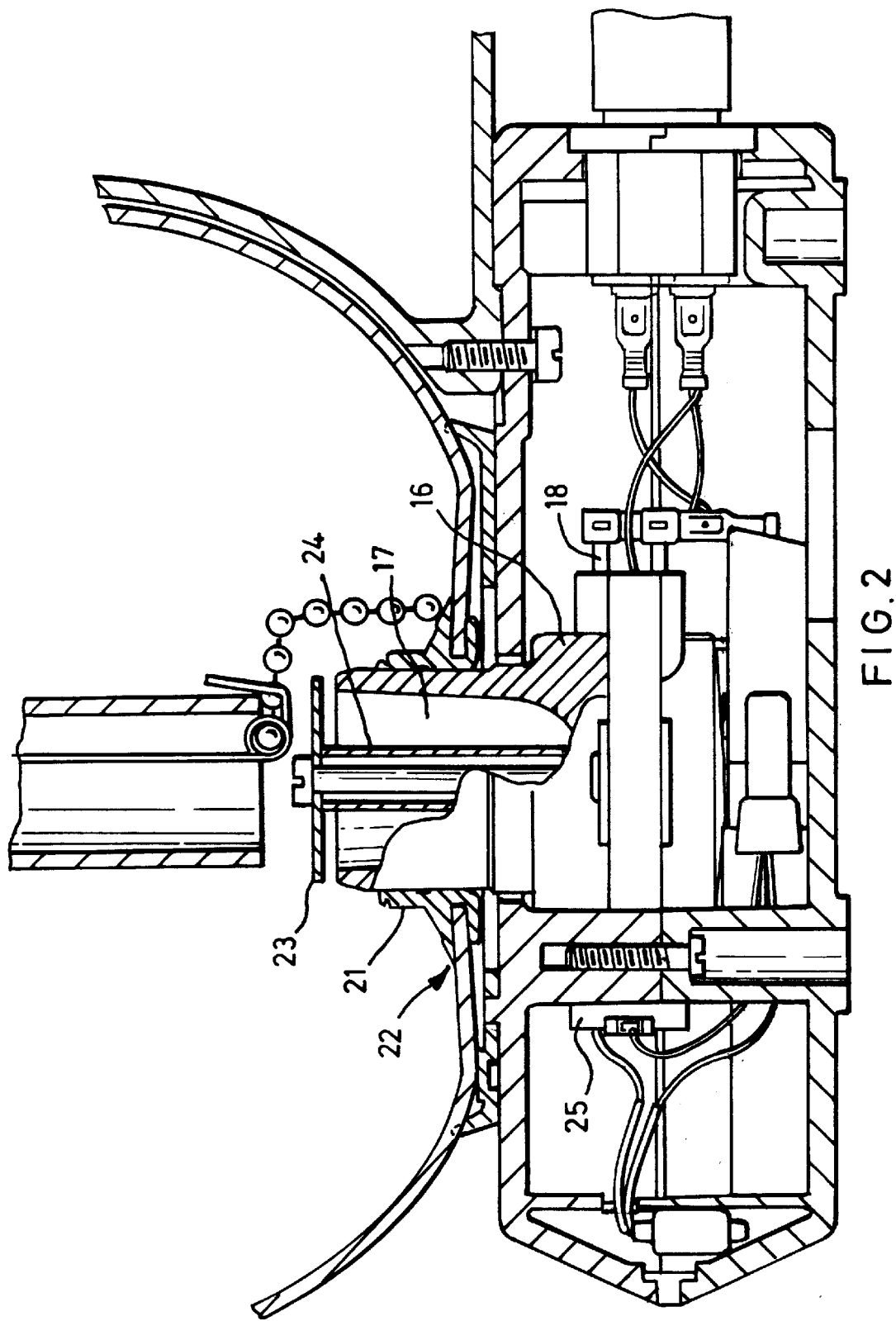

VACUUM COFFEE MAKER

BACKGROUND OF THE INVENTION

1. Field of the Invention

The invention relates to vacuum coffee makers.

2. Description of Prior Art

In a vacuum coffee maker, there are two containers one above the other with a tube extending down from the bottom of the upper container through the lower container to adjacent its base. Conventionally the lower container has a base integrally formed with the rest of the container which is arranged to be heated by a flaming burner or grill plate. A filter is placed at the top of the tube, that is in the bottom of the upper container, and dry coffee grounds placed on top of the filter. The lower container is filled with water, usually pre-heated, and the two containers fitted together and separated and sealed by a supporting resilient stopper.

In order to prepare coffee, a burner is placed under the base of the lower container to heat the water. As the water expands and boils, water is forced up the tube past the filter and into the upper container, mixing with the coffee. When the water has all evaporated in the lower container, the burner is removed. Water is drawn down through the filter by vacuum to the lower container, the upper container is removed and the freshly made coffee served from the lower container.

Such vacuum coffee makers however require supervision, particularly to remove the burner at the required time. Also, the flow of water up the tube, especially when only a small quantity remains in the lower container, can become erratic due formation of steam bubbles from the heater surface. This leads to spasmodic flow of water upwards through the tube especially towards the end of a heating cycle.

SUMMARY OF THE INVENTION

It is an object of the invention to overcome or at least reduce these problems.

According to the invention there is provided a vacuum coffee maker having a lower container with an aperture in its base, a starved electric heater fitted to the aperture, the heater comprising a metallic body with a chamber forming a cup-shaped reservoir with heating surfaces and a top for the reservoir that generally allows water to freely enter the reservoir but serves to contain a head of steam when water in the chamber is at a relatively high temperature, the head of steam restricting flow of water into the reservoir in use and so starves the reservoir of water, and an electric element arranged to heat the chamber.

The top may be separately formed and supported by the metallic body.

The top may rest on a top of the reservoir including indentations in mating supporting surfaces to allow water to enter the reservoir.

The top may be formed with apertures that allow flow of water into and out of the reservoir. The apertures are preferably positioned so as to prevent water flowing directly vertically upwards into a bottom opening of a tube extending down from an upper container.

A temperature sensor element may be provided adjacent the heating chamber and a control circuit arranged to control a power supply to the electric heating element in response to signals from the sensor element, in which the control circuit is arranged to turn the power supply ON and OFF to provide a KEEP-WARM function for the lower container.

BRIEF DESCRIPTION OF THE DRAWING

Vacuum coffee makers according to the invention will now be described by way of example with reference to the accompanying drawings in which:

FIG. 2 is a part of a similar coffee maker to a large scale.

DESCRIPTION OF THE PREFERRED EMBODIMENTS

Figure 1:
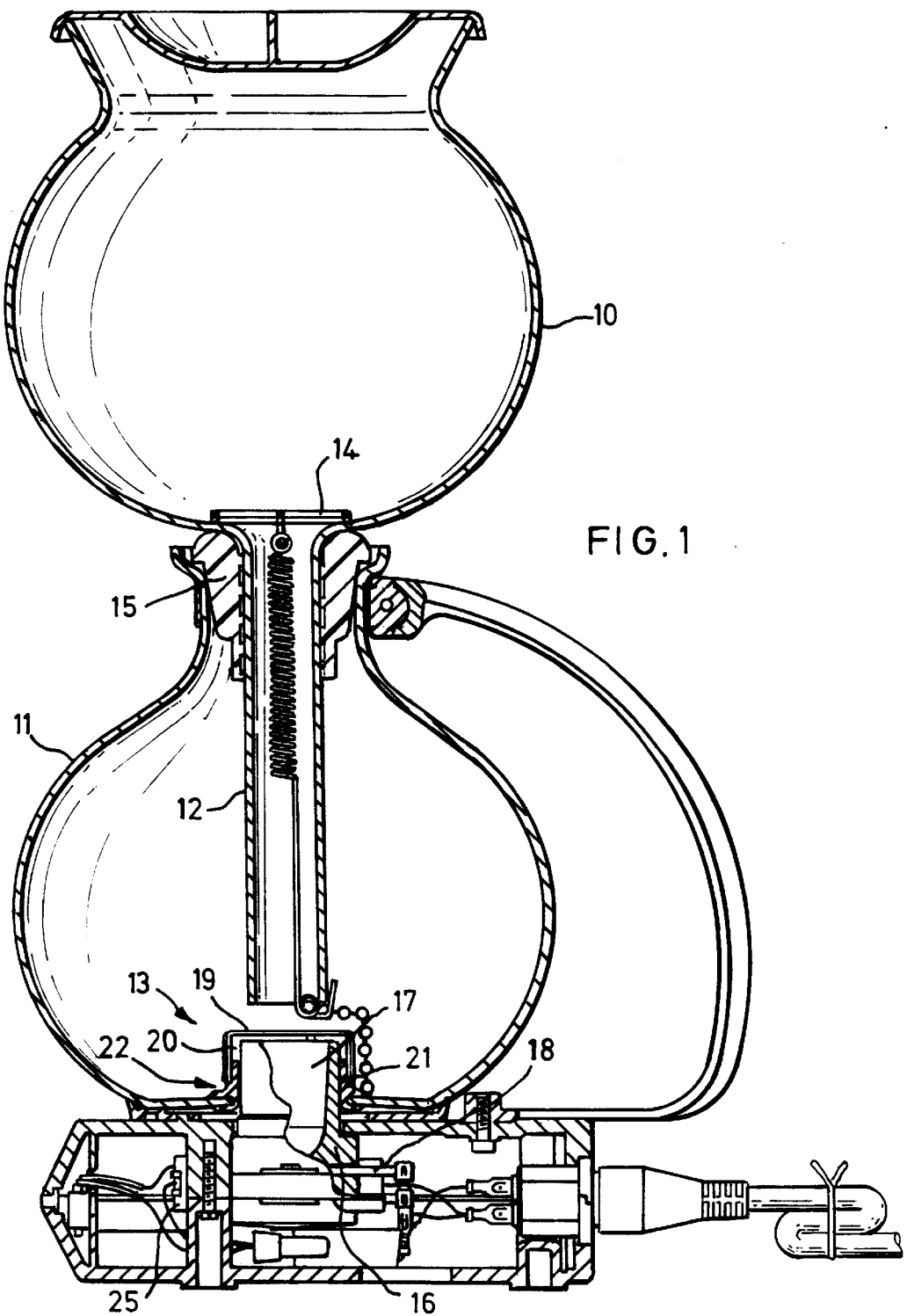
FIG. 1 is a cross-sectional elevation of the coffee maker.

Referring to the drawings, in FIG. 1 the coffee maker has an upper container 10 and a lower container 11. An integrally formed tube 12 extends down from the bottom of the upper container through the lower container to just above an electric heater arrangement 13. A filter support 14 is positioned at the top of the tube 12 and in use a quantity of dry coffee (not shown) is placed in the bottom of the top container 10. The containers 10 and 11 are separated and sealed by a resilient stopper 15.

The heating arrangement 13 comprises a solid metallic body 16 integrally formed with a circular open-topped reservoir 17. An electric heating element 18 is held inside the body 16 in a suitable cavity. A circular lid 19 fits over the reservoir 17 which is formed with a downward projecting peripheral apertured lip 20. The lid serves to control the flow of water and steam between the lower container 11 and the reservoir 17, as will be explained more fully below. Steam bubbles formed in the reservoir are ejected away sideways and so do not rise directly vertically into the inlet of tube 12. As a result the bubbles cause little or no interruption to the flow of hot water into and up the tube 12.

The body 16 is frictionally held by a seal 21 in an aperture in the base of the lower container 11. The seal 21 has externally disposed peripheries lips 22 to receive edges of the aperture.

In use, instead of a burner being used to heat water in the lower container, power is supplied to the electric heating element 18. In conventional manner, heated water is then forced up the tube 12 and beyond the filter support 14 during the coffee making procedure.

In FIG. 2, like parts have the same reference numerals as in FIG. 1. The only difference in FIG. 2 however is that a top for the reservoir 17 is provided with a circular disc 23 supported on a centrally disposed post 24. In FIG. 1 apertures in the side of the lid 19 allowed communication between the reservoir 17 and the lower container 11, in FIG. 2 a peripheral gap between the top surfaces of the reservoir 17 and the disc allows communication.

In practice there are many suitable ways of providing the heater arrangement 13, and, for example, the body 16 and the lid 19, or the body 16 and the disc 23, could be integrally formed if preferred. A lid could be supported on the top of the reservoir and its surface or the top surface arranged with undulations to allow passage of water between the reservoir and the lower container 11. At present the two described arrangement represent two preferred design choices because the heater body 16 with its embedded heater elements 18 and so forth (but without a lid or top), is already in wide use for heating coffee and water containers. The lid or top act to convert a generally conventional heater into what Applicants herein refer to as a "starved" heater.

During initial heating in a starved heater, water circulates in and out of the reservoir 17 with very little flow restriction, and water in the lower compartment is heated up by the heating arrangement 13. The hot water is forced up the tube 12 in conventional manner. It has already been mentioned that the lid or top also serves to prevent steam bubbles rising directly vertically into the tube 12 and so water flows in a controlled manner even when the quantity of water remaining in the lower container has reduced to a small quantity. This is at least partly because bubbles or bursts of steam are deflected away from the mouth of the tube 12 by the lid 19 or top or disc 23. As such, the steam bubbles tend to simply enter and dissipate in the lower container and do not disturb normal flow of hot water up the tube.

When all the water has been evaporated from the lower container, the reservoir 17 becomes completely empty and the temperature of the body 16 rises very rapidly. As the rise is rapid, it is very simple to monitor in practice and in generally conventional manner. A suitably placed temperature sensitive element or thermostat 25 is used to control electric power automatically that is supplied to the heating element 18. This also means that no supervision is required to turn off the heater once the heating cycle is completed.

However, a main advantage of the starved heater is that without making any alterations to a thermostat setting for example which is normally set at around 200° C. in these embodiments and corresponds to the temperature of the outside of the heater body, the heater arrangement 13 can be used to keep-warm a quantity of coffee (or water) in the lower compartment, at say around 95° C. What happens in practice, is that the reservoir 17 tends to retain a head of steam that restricts hot water entering the reservoir. Any liquid that does enter the hot reservoir is normally immediately evaporated so in effect the reservoir is starved of a supply of water. Electric power is automatically applied from time to time to the heating element 18 to maintain the heater body 16 at around 200° C., otherwise the reservoir walls would cool down too much and not immediately evaporate water entering the reservoir, and so the reservoir would fill with water. In practice, the keep-warm heating cycles are each for quite short periods of time and the coffee is automatically maintained at about 95° C.

The overall design of the heating arrangement 13 is such that the lid 19 or disc 23 allow water to enter and leave the reservoir with little restriction during the first or normal heating cycle when the coffee is being made. However, once the reservoir 17 is empty and hot coffee has flowed back into the lower container 11 which coffee is at a fairly high temperature generally above 90° C., the relative disposition of the lid or disc are such that the reservoir is essentially thereafter starved of liquid. Short keep-warm heating cycles thereafter maintain the coffee at the high temperature. In other words, the heating arrangement 13 serves to make the coffee without supervision, by turning off automatically when a first sudden rise in its temperature indicates that the container 11 is empty, and also acts without a change in its operating parameters to provide a keep-warm function. In short, there is no need to have a separate heater for a keep-warm function.

I claim:

1. A vacuum coffee maker having a lower container with an aperture in a base, a starved electric heater fitted to said aperture, said heater comprising a metallic body with a chamber forming a cup-shaped reservoir with heating surfaces and a top for said reservoir spaced apart from a tube extending downwardly from an upper container, said reservoir top generally allowing water to freely enter said reservoir but serving to contain a head of steam when water in said chamber is at a relatively high temperature, said head of steam restricting flow of water into said reservoir in use and so starves said reservoir of water, and an electric element arranged to heat said chamber.

2. A vacuum coffee maker according to claim 1, in which the top is separately formed and supported by the metallic body.

3. A vacuum coffee maker according to claim 2, in which said top rests on a top of said reservoir including indentations in mating supporting surfaces to allow water to enter said reservoir.

4. A vacuum coffee maker according to claim 1, in which the top is formed with apertures that allow flow of water into and out of the reservoir.

5. A vacuum coffee maker according to claim 4, in which said apertures are positioned so as to prevent water flowing vertically upwards into a bottom opening of said tube extending down from said upper container.

6. A vacuum coffee maker according to claim 5, further comprising a temperature sensor element adjacent said heating chamber and a control circuit arranged to control a power supply to said electric heating element in response to signals from said sensor element, in which said control circuit is arranged to turn said power supply ON and OFF to provide a KEEP-WARM function for said lower container.

* * * * *